US009388841B2

(12) United States Patent
Allmon et al.

(10) Patent No.: US 9,388,841 B2
(45) Date of Patent: Jul. 12, 2016

(54) RATCHETING-TYPE SHRINKAGE COMPENSATING DEVICE FOR USE IN CONTINUOUS TIE-DOWN SYSTEMS

(71) Applicants: James A. Allmon, Danville, CA (US); Noah S. Hill, Petaluma, CA (US); John D. Pryor, Oakland, CA (US); Peter W. Schuyler, Kenwood, CA (US)

(72) Inventors: James A. Allmon, Danville, CA (US); Noah S. Hill, Petaluma, CA (US); John D. Pryor, Oakland, CA (US); Peter W. Schuyler, Kenwood, CA (US)

( * ) Notice: Subject to any disclaimer, the term of this patent is extended or adjusted under 35 U.S.C. 154(b) by 0 days.

(21) Appl. No.: 14/214,364

(22) Filed: Mar. 14, 2014

(65) Prior Publication Data

US 2014/0260067 A1 Sep. 18, 2014

Related U.S. Application Data

(60) Provisional application No. 61/781,411, filed on Mar. 14, 2013, provisional application No. 61/856,602, filed on Jul. 19, 2013.

(51) Int. Cl.
*E04B 1/38* (2006.01)
*E04C 5/00* (2006.01)
*F16B 35/04* (2006.01)
*F16B 37/08* (2006.01)
*E04B 1/26* (2006.01)
*E04B 1/35* (2006.01)

(52) U.S. Cl.
CPC . *F16B 35/04* (2013.01); *E04B 1/26* (2013.01); *F16B 37/0857* (2013.01); *E04B 2001/268* (2013.01); *E04B 2001/2688* (2013.01); *E04B 2001/3583* (2013.01)

(58) Field of Classification Search
CPC ............. F16B 37/0807; F16B 37/0828; F16B 37/0842; F16B 35/04; F16B 1/26; F16B 37/0857; F16B 2001/268; F16B 2001/2688; F16B 2001/3583
USPC ............... 52/92.2, 167.4, 223.13, 293.3, 295, 52/573.1, 704, 711; 411/266, 267, 270, 411/278
See application file for complete search history.

(56) References Cited

U.S. PATENT DOCUMENTS

| | | | | |
|---|---|---|---|---|
| 5,749,691 A | * | 5/1998 | Campbell | 411/433 |
| 5,988,965 A | * | 11/1999 | Fiorell et al. | 411/303 |
| 6,361,260 B1 | * | 3/2002 | Schirrmacher | 411/433 |
| 8,162,558 B2 | * | 4/2012 | Warner | 403/109.1 |
| 2007/0014630 A1 | * | 1/2007 | Brown et al. | 403/345 |
| 2007/0025825 A1 | * | 2/2007 | Virdee | 411/267 |
| 2007/0286702 A1 | * | 12/2007 | Smith | 411/432 |
| 2008/0282640 A1 | * | 11/2008 | Mathews et al. | 52/711 |
| 2009/0205273 A1 | * | 8/2009 | Hayes et al. | 52/223.13 |

(Continued)

*Primary Examiner* — Brian Mattei
(74) *Attorney, Agent, or Firm* — Hamrick IP-Law Office; Claude A.S. Hamrick

(57) ABSTRACT

A ratcheting-type rod engaging nut and assembly for releasably engaging a tie-down rod, and including a generally cylindrical body element having an upper cylindrical portion of a first diameter, a lower cylindrical portion of a second diameter less than the first diameter, and a tapered bore coaxial with and interconnecting the upper bore and the lower bore; an assembly of rod gripping segments disposed within the internal bore and surrounding a passageway for receiving a tie-down rod, each segment of the assembly including an outwardly facing surface having a tapered portion for engaging the tapered bore, and an inwardly facing surface for engaging the rod. A cap is disposed at the top of the body element and includes springs for downwardly biasing the segments into engagement with the tapered bore and for causing the facing surfaces of the segments to engage an outer surface of the rod.

14 Claims, 12 Drawing Sheets

(56) References Cited

U.S. PATENT DOCUMENTS

| | | | |
|---|---|---|---|
| 2009/0226281 A1* | 9/2009 | Taneichi | 411/433 |
| 2010/0100134 A1* | 4/2010 | Mocanu | A61B 17/863 606/281 |
| 2011/0052344 A1* | 3/2011 | Xu | 411/259 |

* cited by examiner

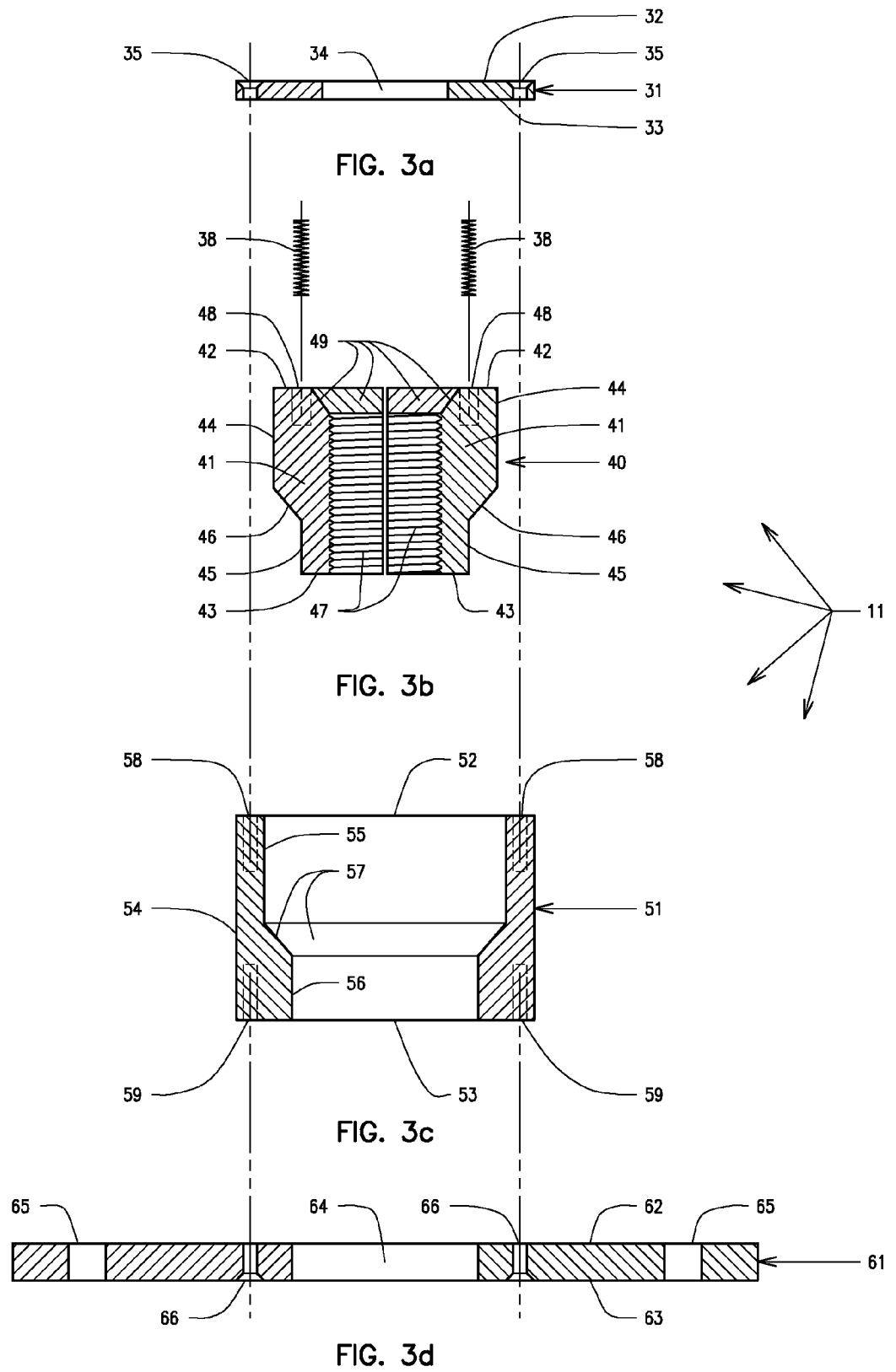

RATCHETING-TYPE SHRINKAGE COMPENSATING DEVICE FOR USE IN CONTINUOUS TIE-DOWN SYSTEMS

FIELD OF INVENTION

The present invention relates generally to building construction components, and in particular, to an improved ratcheting type shrinkage compensating device used in continuous tie-down systems.

BACKGROUND

A Shrinkage Compensating Device (SCD) is generally included as a sub-component of a Continuous Tie-down System (CTS). CTS's are a critical element of both single and multi-story plywood shearwall systems, such as those used in multi-unit timber framed residential construction, and are designed to resist the overturning forces associated with those types of shearwalls. A CTS is typically located near each end of a shearwall system, and will generally consist of one or more lengths of rod or all-thread rod interconnected with couplers. One end of the CTS is typically anchored to a fixed foundation element and then attached to each level of the plywood shearwall system with a bearing plate and SCD.

The purpose of the SCD is to compensate for any differential movement that can occur between the CTS and the building (due to such things as moisture related wood shrinkage and building settlement), so as to keep the attachment points between the CTS and the plywood shearwall system tight. By doing this, the vertical uplift related movement of the plywood shearwall is minimized, which in turn also limits the lateral drift or deflection of the shearwall caused by the uplift movement of the CTS.

One type of SCD that can be used in a CTS is referred to as a Ratcheting Type SCD (RT-SCD). A ratcheting type SCD will generally consist of a body element with a frusto-conical bearing surface, a base plate attached to the bottom of the body element, a cap element secured to the top of the body element, a plurality of rod gripping segments located within the body element and configured to engage its frusto-conical bearing surface, and springs positioned between the top of the rod gripping segments and bottom of the cap element so as to provide a constant force that pushes the rod gripping segments down into the frusto-conical bore of the body element. The base plate is provided with holes that allow the SCD to be attached to a timber framing element of the CTS. Examples of RT-SCD's are described in U.S. Pat. No. 6,195,949 (Schuyler), and U.S. Pat. No. 7,752,824 (Brown), and U.S. patent application Ser. No. 11/667,604, Smith.

ICC Evaluation Service (a subsidiary of the International Code Council) has developed an acceptance criteria that is used for the evaluation of SCD's used in CTS's. This document is referred to as AC316 (revised June 2012), and is entitled "Acceptance Criteria for Shrinkage Compensating Devices." AC316 includes a number of critical performance related provisions for SCD's, including the minimum misalignment tolerance that the SCD must accommodate between the rod and SCD, a limitation to the amount of incremental travel and reseating a RT-SCD may sustain, and limits on the combined displacement between the restraints of a CTS (typically the floor-to-floor attachment points).

Device Average Travel and Seating Increment (DATSI) is the term used in AC316 with regard to the incremental travel and reseating of a RT-SCD. Per Section 1.4.7 of AC316, DATSI: ($\Delta_R$) is defined as the average of the movement required to cause incremental motion from a seated position ($\Delta_1$) and the opposite motion required to reseat the device after the actuation or ratcheting ($\Delta_2$). Thus, $\Delta_R=(\Delta_1+\Delta_2)/2$. For a typical ratcheting SCD on a standard rod, a minimal theoretical DATSI might include a travel increment ($\Delta_1$) equal to 1.40 times the rod thread pitch, and a seating increment ($\Delta_2$) equal to 0.40 times the rod thread pitch. Given this, the DATSI a rod with a thread pitch of 10 TPI (Threads Per Inch) works out to be $\Delta_R=(0.100\times1.40+0.100\times0.40)/2=0.090"$. For a rod with a thread pitch of 7 TPI the DATSI works out to be $\Delta_R=(0.143\times1.40+0.143\times0.40)/2=0.129"$.

Per Section 1.4.8 of AC316, the allowable deflection limit of a SCD is defined as $\Delta_A=0.132"-\Delta_R$ (based on Allowable Stress Design or ASD). This equation can also be rearranged as $\Delta_A+\Delta_R=0.132"$ (ASD). In addition, per Section 6.0.9 of AC316 there is a new provision that limits the combined displacement from rod elongation, SCD device deformation ($\Delta_A$), and DATSI ($\Delta_R$) to a maximum of 0.200" between the restraints of a CTS (typically the floor-to-floor attachment points). Due to this overall displacement limitation it now has becomes very important to keep the DATSI of a SCD to a minimum, so as maximize the displacement allowed the rod, and thus maximizes the load capacity that may be resisted by the rod and associated CTS.

One of the deficiencies with the RT-SCD's that are currently available for use with CTS's is that all of these RT-SCD's currently have rod gripping segments that are configured to engage the standard threads associated with commonly available rod. The problem with this is that these RT-SCD's can have DATSI values that significantly limit the capacity of the CTS per the requirements set forth in AC316, particularly for large diameter rods with reduced thread pitches. In some cases it is possible that the DATSI values for some SCD's will exceed the allowable deflection limit set forth in AC316, and will be restricted from being used in CTS's. As such, it has now become very important that the DATSI values for RT-SCD's be kept to a minimum if the load capacity of the rod and associated CTS is to be maximized. Another problem with the RT-SCD's depicted in the Schuyler and Brown patents, and the Smith patent application, is that due to their configurations, there is little or no tolerance for any misalignment between the rod and RT-SCD. Due to the imperfections inherent in construction, there is a need for RT-SCD's that are capable of providing some misalignment tolerance between the rod and the SCD. As such, AC316 now incorporates minimum misalignment tolerances requirements for SCD's used in CTS's.

Another deficiency with the RT-SCD's that are currently available for use with CTS's is that they do not provide a means that can assist in facilitating the disengagement of the rod gripping segments from the rod. The inclusion of such features would improve the performance and functionality of RT-SCD's, while also reducing their DATSI values.

Another deficiency with the RT-SCD's that are currently available for use with CTS's is that the rod gripping segments sometimes do not all ratchet at the same time as the rod travels through the SCD, particularly when there is a misalignment between the rod and SCD. When this occurs there is the potential that some of the rod gripping segments will not be in bearing contact with the frusto-conical bore of the body element, and could substantially limit the load capacity of the SCD to that provided by the remaining rod gripping segments that have ratcheted, and are in bearing contact with the frusto-conical bore of the body element. As such, there is a need to provide a means that ensures that all of the rod gripping segments of a SCD will ratchet at the same time, or within an acceptable tolerance range. There is also a need to ensure that these RT-SCD's ratchet properly when there is a misalignment between the rod and SCD.

Another deficiency with the RT-SCD's that are currently available for use with CTS's is that the rod gripping segments are typically free to rotate within the body element of the SCD. This condition can present problems if the SCD needs to be uninstalled, as the only way to remove one of these SCD's is to spin the SCD back up the rod. If the rod gripping segments get jammed or locked onto the threads of the rod, then the body will only spin around the rod gripping segments, making it very difficult, if not impossible to remove the SCD without cutting the rod. To avoid this situation there needs to be provided a means to positively lock the body element of an SCD to the rod gripping segments, and thus allow the SCD to be spun back up the rod as required.

As spinning an RT-SCD back up a rod can take time, it would also be very beneficial to provide the means to disengage the rod gripping segments of an RT-SCD from the rod so as to allow the SCD to be quickly uninstalled by just sliding the SCD back up the rod. This is not provided in any of the RT-SCD's currently available for use with CTS's.

The present invention addresses the above mentioned deficiencies in the prior art RT-SCD's by providing improvements to these SCD's that allow for increased RT-SCD performance, functionality, dependability, and higher allowable load capacities for the overall CTS.

SUMMARY OF THE INVENTION

In accordance with the basic embodiment of the present invention, there is provided an RT-SCD that can be used in a CTS. The RT-SCD has a generally cylindrical body element with a frusto-conical internal bore, a bearing plate secured to the bottom of the body element, a cap element secured to the top of the body element, rod gripping segments with an outer surfaces configured to engage the frusto-conical bore of the body element, and inner surface deformations configured to engage the external deformations on the surface of a rod intended to be used with the RT-SCD, and a plurality of springs, with at least one spring placed between the cap element and each rod gripping segment.

The basic embodiment may include a ratcheting-type rod engaging nut component for use with an elongated tie-down rod to provide a shrinkage compensating system for building structures, the nut component comprising:
a. a generally cylindrical body element having a multipart internal bore including an upper generally cylindrical portion having a first axial diameter, a lower generally cylindrical portion having a second axial diameter less than said first axial diameter, and a tapered bore coaxial with and interconnecting said upper bore and said lower bore;
b. an assembly of rod gripping segments disposed within said internal bore and surrounding a passageway for receiving an elongated tie-down rod passing through said cylindrical body, each said segment of said assembly including an outwardly facing surface having a tapered portion adapted to engage said tapered bore, and an inwardly facing surface adapted to engage the tie-down rod;
c. first means disposed at the upper extremity of said body element for containing said segments within the internal bore; and
d. second means disposed between said first means and said assembly for downwardly biasing said segments into engagement with said tapered bore and causing the facing surfaces of said segments to engage an outer surface of a rod extending through the device.

In accordance with other embodiments of the present invention, there is provided an RT-SCD that may include the following:
a. rod gripping segments with the inner gripping surfaces configured with dual threads, with each individual thread of the dual thread starting 180 degrees apart from each other, and configured to engage the standard thread profiles associated with commonly available rod;
b. rod gripping segments with the inner gripping surfaces configured with dual threads, with the threads configured with a specialized thread profile designed to maximize the engagement between the rod gripping segments and the rod;
c. a body element with inside bore diameters that are greater than the outside diameters of the rod gripping segments, so as to provide a gap between the two, allowing the rod gripping segments to expand freely when the rod ratchets through the RT-SCD;
d. rod gripping segments with the inner gripping surfaces that are provided with threads that are offset between adjacent rod gripping segments;
e. a rod thread converting sleeve with internal threads configured to match the threads of the rod, and external deformations configured to engage the inner surface deformations of the rod gripping segments;
f. a body element with an internal bore configured to provide the rod gripping segments with a bearing point near the mid-height of the rod gripping segments;
g. g body element with an internal bore configured to provide a gap between the bottom of the bearing surfaces between the body element and the rod gripping segments;
h. a body element with an internal bore and bearing surface for the rod gripping segments that is spherical instead of a frusto-conical;
i. A body element with an internal bore and bearing surface for the rod gripping segments that is both spherical and frusto-conical;
j. rod gripping segments that have a continuous exterior circumferential groove, and a band that fits into this groove configured to minimize the differential displacement between the rod gripping segments;
k. a cap element and rod gripping segments both configured to cause the gripper segments to spread outwards and disengage from the rod when the gripper segments are forced upwards by the rod towards the cap element;
l. the location of the springs between the rod gripping segments and the cap element so as to facilitate the outwards spreading of the gripper segments, and disengagement of the gripper segments from the rod;
m. a body element and rod gripping segments that have corresponding apertures in either their respective sides or tops that allow for a pin to be temporally inserted into each, and locking them together; and
n. a body element with two or more apertures configured to allow pins to be inserted through the side of the body element and engage a circumferential groove provided in the rod gripping segments, so as to allow the rod gripping segments to be forced upwards towards the cap element, and disengage from the rod.

BRIEF DESCRIPTION OF THE DRAWINGS

FIGS. 3a-3d are a combined exploded cross-sectional view of the RT-SCD;

FIG. 3a is a cross-sectional view of the cap element;

FIG. 3b is a cross-sectional view of the rod gripping segments and urging spring;

FIG. 3c is a cross-sectional view of the body element;

FIG. 3d is a cross-sectional view of the base plate;

DETAILED DESCRIPTION OF PREFERRED EMBODIMENTS

Figure 1:
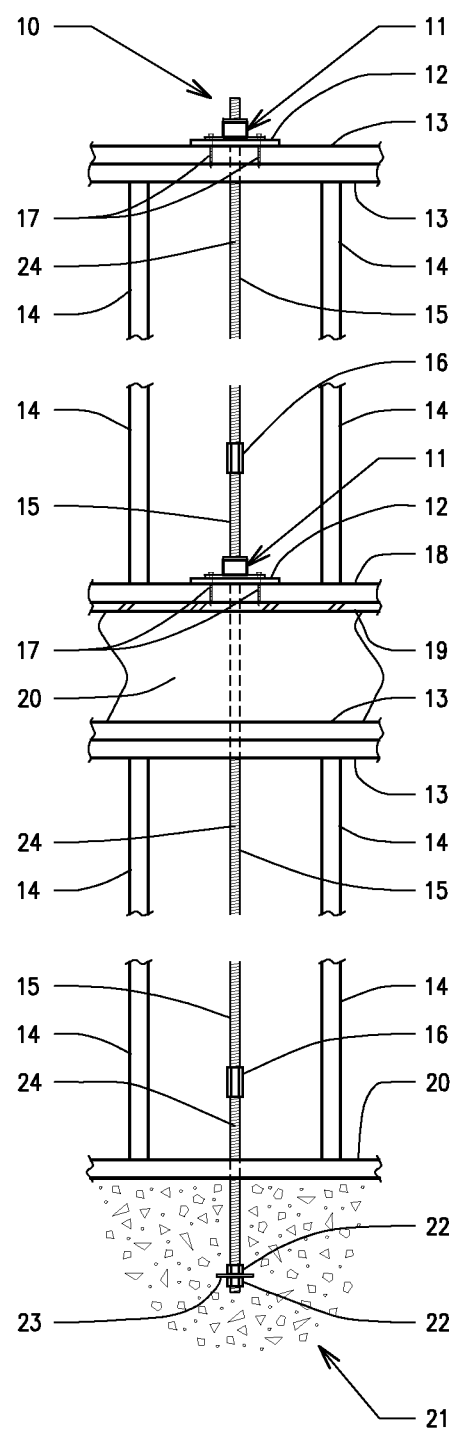
FIG. 1 is a multi-story elevational view of a CTS.

An embodiment of a CTS 10 that might be used in a multi-story plywood shear wall system to impart tie-down forces is illustrated in FIG. 1. CTS 10 will typically include a plurality of rods 15 interconnected with couplers 16, with one end of the lower rod 15 secured to a concrete foundation element 21 with an anchor plate 23 and nuts 22. Rod 15 will typically be provided with rod deformations 24, which will typically consist of a standard thread profile, but can also consist of a custom or specialized thread profile, or unique deformation pattern.

The CTS 10 is typically located equidistant between studs 14, and extends from foundation 21, through a sill plate 20, top plates 13, rim joist and/or blocking 20, plywood sheathing 19, sill plate 18, and top plates 13. The CTS 10 is secured to various building elements at the various levels of a multi-story plywood shearwall system, including sill plates 18 and/or top plates 13, with an RT-SCD 11 and base plate 12. Each RT-SCD 11 will typically be secured to a building element, including sill plates 18 and top plates 13, with fasteners 17. Fasteners 17 will typically consist of wood screws, lag bolts, or bolts that extend through bearing plates 12 into or through the building element.

The purpose of the RT-SCD's 11 is to compensate for displacements that can occur between the CTS 10 and the attachments points between the CTS 10 and the building elements at the various levels of a multi-story plywood shearwall system, including sill plates 18 or top plates 13. The displacements are usually caused by moisture related wood shrinkage, but can be due to a number of other causes, including building settlement, and the compression of the various wood framing elements due to the presence of additional loads after the CTS 10 has been installed.

Figure 2A:
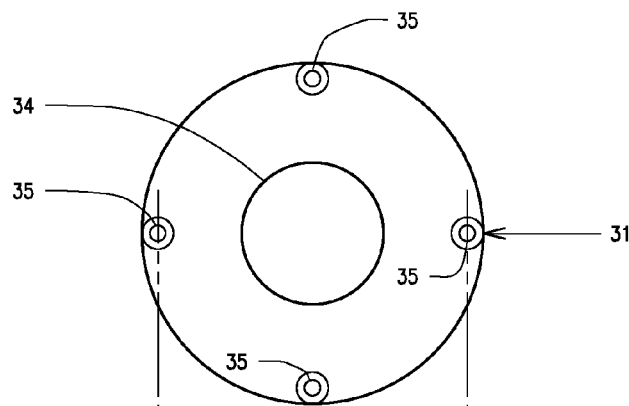
FIG. 2a is a top view of the cap element.
Figure 2B:
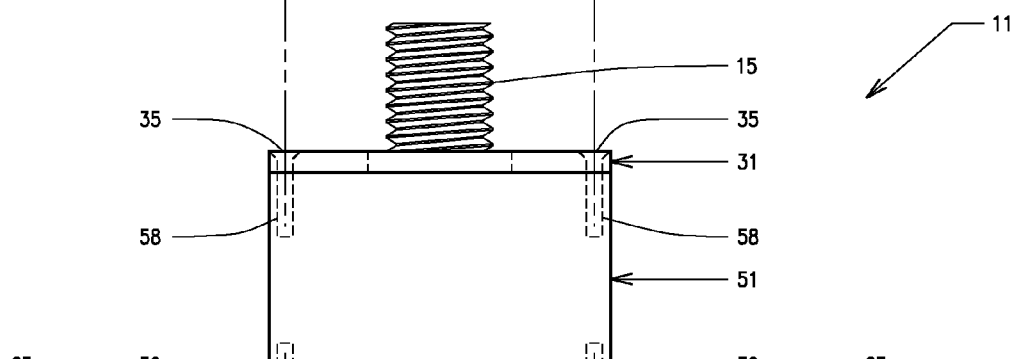
FIG. 2b is an elevation view of an RT-SCD, including cap plate, body elements (with internal components not shown), and the base plate, along with a length of rod passing through the RT-SCD.
Figure 2C:
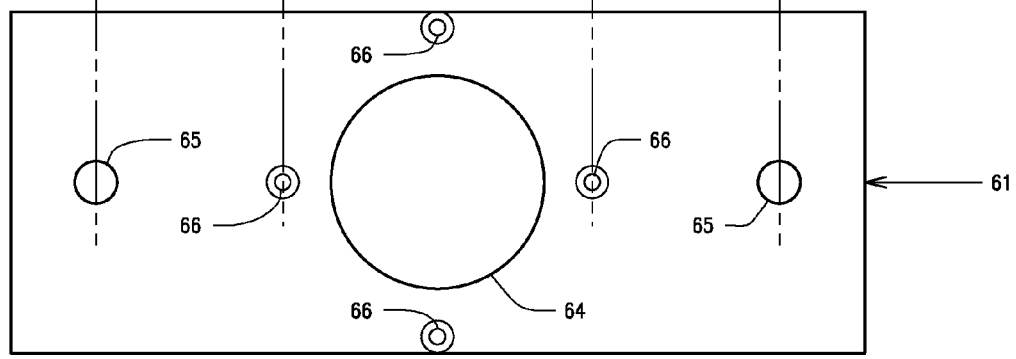
FIG. 2c is a bottom view of the base plate.

An embodiment of a RT-SCD 11 is illustrated in more detail in FIGS. 2a, 2b, and 2c. As previously stated, The purpose of RT-SCD 11 is to allow rod 15 to move upwards through RT-SCD 11, while resisting any downwards movement (or only allowing rod 15 to be able to travel upwards through RT-SCD 11).

Specifically, FIG. 2a shows a top view of cap element 31, which includes a rod receiving central aperture 34, and a plurality of fastener apertures 35 extending therethrough. Fastener apertures 35 are configured to align with threaded bores 58 (FIG. 2b) formed in the upper extremity of cylindrical body element 51, and provide for the attachment of cap element 31 to the top thereof using suitable threaded fasteners.

FIG. 2b is an elevational view of the RT-SCD 11, including cap element 31, body element 51, and base plate 61, along with rod 15. FIG. 2b also generally depicts the threaded bores 59 provided in the lower extremity of body element 51, a side view of base plate 61 and the central aperture and attachment apertures 65 and 66 provided therein.

FIG. 2c shows a bottom view of base plate 61, with the rod receiving central aperture 64, a plurality of attachment apertures 65, and a plurality of fastener apertures 66. Fastener apertures 66 are configured to align with the threaded bores 59 provided in the lower extremity of body element 51 shown in FIG. 2b, and provide for the attachment of base plate 61 to the bottom of body element 51 using appropriately configured fasteners. Attachment apertures 65 are configured to provide for the attachment of base plate 61 (and RT-SCD 11) to a building element, such as sill plate 18 and/or top plate 13, as shown in FIG. 1, using suitable screws or lag bolts or the like.

FIGS. 3a, 3b, 3c, and 3d illustrate an expanded, or "exploded" cross-sectional view of a RT-SCD 11, including a cap element 31, a body element 51, a base plate 61, and a rod gripping assembly 40.

More specifically, FIG. 3a is a cross-sectional view of cap element 31, with a top surface 32, a bottom surface 33, a centrally disposed rod aperture 34, and a plurality of fastener apertures 35. Cap plate 31 and its apertures are configured to match the configuration of body element 51 shown in FIG. 3c. The top surface 32 of cap plate 31 will generally be parallel to its bottom surface 33, and will have an appropriate thickness. Rod receiving aperture 34 will be configured to receive a tie down rod like that described shown above. Fastener apertures 35 are configured to align with the threaded apertures 58 provided in the upper extremity of body element 51.

FIG. 3b is a cross-sectional view of a rod gripping assembly 40 which will be described below.

FIG. 3c is a cross-sectional view of a body element 51, and includes an annular top surface 52, an annular bottom surface 53, a cylindrical exterior surface 54, an upper bore 55 of a first diameter, a lower bore 56 of a second diameter less than the first diameter, and a frusto-conical bore 57 located between and joining the upper bore 55 and lower bore 56. A plurality of threaded fastener receiving bores 58 are formed in the upper surface 52, and a plurality of threaded fastener receiving bores 59 are formed in the lower surface 53. As mentioned above, exterior surface 54 will generally be cylindrical in geometry, but may also be oval, tapered, frusto-conical, square, rectangular, or of any other geometric shape, or combination of shapes. Body element 51 will have an appropriate axial length, and top surface 52 will generally be parallel to bottom surface 53. The inner diameters along the lengths of upper bore 55 and lower bore 56 will respectively be generally constant along their lengths but can also vary along their respective lengths, such that upper bore 55 and lower bore 56 might be configured with profiles that are tapered, frusto-conical, stepped, or of some combination of these configurations. As may be required, or desired, the length of the bottom bore 56 of the body element 51 can be reduced to zero.

The threaded fastener bores 58 are preferably spaced around the top surface 52 at regular intervals, and will generally be configured to align with the fastener receiving apertures 35 formed in with cap element 31. The threaded fastener receiving bores 59 are disposed at regular intervals around the bottom surface 53 of element 51, and will generally be configured to align with the fastener apertures 66 formed in base plate 61.

FIG. 3d is a cross-sectional view of a base plate 61, with a top surface 62, a bottom surface 63, a centrally disposed rod receiving aperture 64, a first set of fastener receiving attachment apertures 65, and a second set of fastener receiving apertures 66. Top surface 62 of base plate 61 will generally be parallel to bottom surface 63, and the plate will have an appropriate thickness. Fastener apertures 66 are configured to align with the threaded bores 59 provided in the lower extremity of body element 51 shown in FIG. 3c.

Returning now to FIG. 3b which is a cross-sectional view of a rod gripping assembly 40, it will be understood that the assembly includes a plurality of rod gripping segments 41, and a corresponding plurality of downwardly urging springs 38 adapted for disposition in corresponding spring receiving bores 48 respectively formed in the upper surfaces of the several segments 41. The upper portions of the assembled rod gripping segments 41 are adapted to collectively form a segmented cylinder of a first outside diameter, with each segment having a partial annular top surface 42. Similarly, the lower portions of the assembled rod gripping segments 41 are adapted to collectively form a segmented cylinder of a second outside diameter smaller than the first diameter, with each segment of the lower portions having a partial annular lower surface 43. The assembly also includes an intermediate portion collectively forming a segmented frusto-conical bearing surface 46 located between and joining the upper portion 44 and the lower portion 45. A segmented generally cylindrical bore 47 extends axially through the assembly and has a threaded or other irregular surface formed therein which forms rod gripping deformations 47.

Figure 16A:
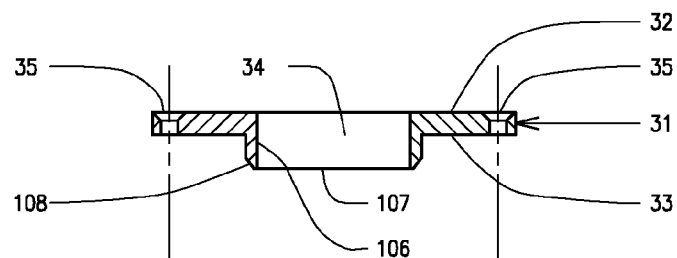
FIG. 16a is a cross-sectional view of the cap plate with a rod gripping spreader projection.

The outer diameters along the lengths of the upper assembly portions 44 and lower assembly portions 46 will generally be constant, but can also vary along their respective lengths, such that upper portions 44 and lower portions 45 might be configured with profiles that are tapered, frusto-conical, stepped, or have some combination of these configurations. As may be required, or desired, the length of the bottom portions 45 of the rod gripping segments 41 can be reduced to zero. The frusto-conical bearing surfaces 46 of the rod gripping segments 41 will be optimally configured to engage the frusto-conical bore 57 of body element 51. The frusto-conical bore 49 may be omitted, unless cap element 31, with rod gripping segment spreader projection 106, as shown in FIG. 16a, is to be provided.

As mentioned above, included with the rod gripping assembly 40 are urging springs 38. Generally, there will be a minimum of one urging spring 38 for each rod gripping segment 41, with each urging spring 38 adapted to be received in an urging spring bore 48 formed in the top surface 42 of each rod gripping segment 41. When assembled, the springs 38 will be compressed between the rod gripping segments 41, and the bottom surface 32 of cap element 31, and thus provide a force that urges the rod gripping segments 41 into the frusto-conical bore 57 of body element 51, to facilitate the engagement between the rod gripping deformations 47 on the interior surfaces of the segments 41 and the rod 15.

Figure 4:
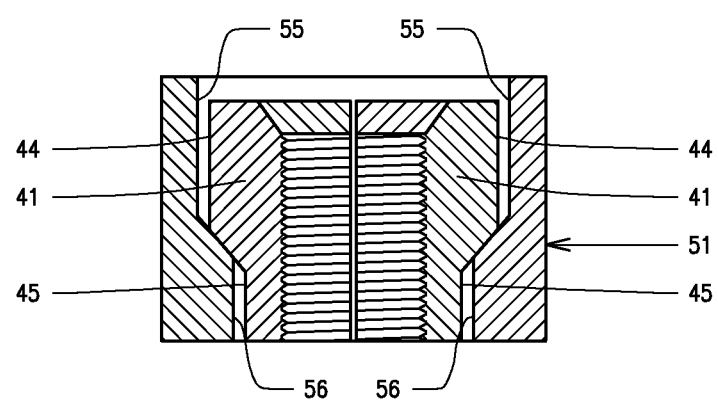
FIG. 4 is a cross-sectional view of the body element combined with the rod gripping segment shown in FIGS. 3b and 3c.

FIG. 4 is a cross-sectional view of the rod gripping assembly 40 seated within body element 51. Due to the loose fitting configuration of both the upper bore 55 and lower bore 56 of body element 51 in combination with the outer diameters of both the upper portion 44 and lower portion 45 of the rod gripping segments 41, a gap is provided between the inside surfaces of the upper bore 55 and outside surfaces of the upper portions of rod gripping segments 41, as well between the inside surfaces of the lower bore 56 and outside surfaces of the lower portions of rod gripping segments 41. These gaps allow the rod gripping segments 41 to expand freely, and disengage from the rod 15, when the rod 15 ratchets up through the RT-SCD 11. These gaps also allow the rod gripping assembly 40 to gimbal within the body element 51, and accommodate a certain amount of misalignment tolerance between the rod 15 and the RT-SCD 11, when installed as shown in FIG. 1 or FIG. 2b.

Figure 5:
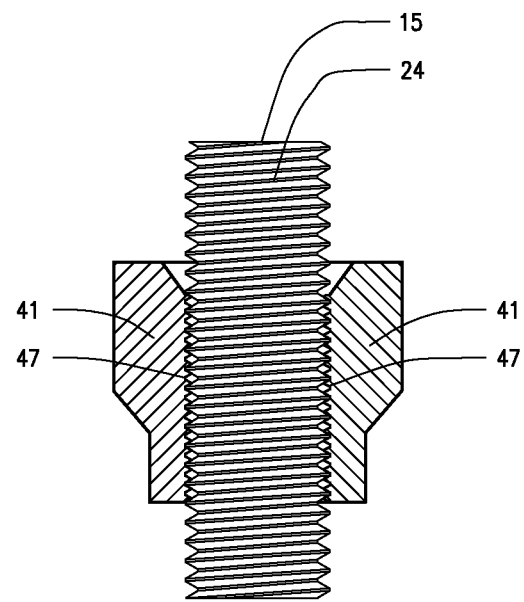
FIG. 5 is an elevational view of the rod gripping segments attached to a rod.

FIG. 5 is a cross-sectional view showing the rod gripping segments 41 in locking engagement with rod 15, in this case, the rod having a standard thread profile 24. As illustrated, the rod gripping deformations 47 of segments 41 are configured with dual threads, with each individual thread of the dual thread starting 180 degrees apart from each other, and configured to engage the standard thread profiles associated with commonly available rod. The purpose of providing the rod gripping segments 41 with dual thread rod gripping deformations 47 is to significantly reduce the DATSI values associated with RT-SCD's 11.

Figure 6:
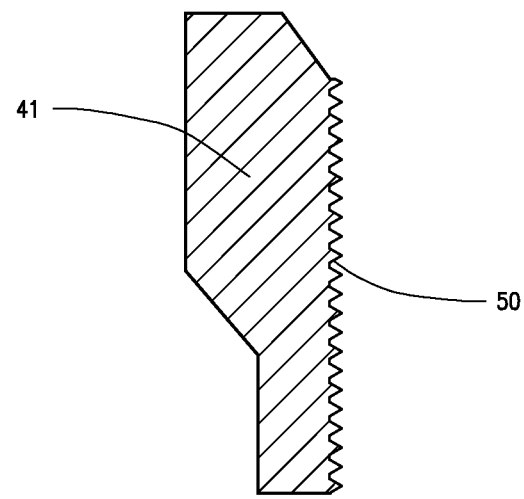
FIG. 6 is an enlarged cross-sectional view of the rod gripping element shown in FIG. 5, with a specialized thread profile.

FIG. 6 is an enlarged cross-sectional view of a rod gripping segment 41 with a specialized dual thread profile 50. This specialized dual thread profile is intended to be compatible with the American Standard Coarse Threads (NC) of the rods 15 that are typically used in CTS's, and is essentially a double lead thread with the threads offset 180 degrees from each other with thread profiles that are very similar to that of an American Standard Course Thread, with one significant modification; this modification eliminates the "flat" at the top of the thread (at the Minor Diameter) and replaces it with a sharp V-thread profile as illustrated in FIG. 6. The purpose of this "specialized" modification is to maximize the engagement between the dual threads of the rod gripping segments 41 and the rod threads 24, so as to maximize the gripping capacity of the rod gripping segments 41.

Figure 7:
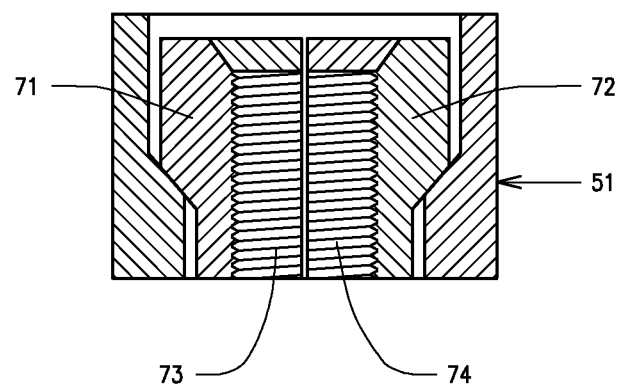
FIG. 7 is a cross-sectional view of a body element and rod gripping segments with offset threads.

FIG. 7 is a cross-sectional view of body element 51, and a rod gripping assembly 70, with rod gripping segments 71 and 72. Rod gripping elements 71 and 72 are similar to rod gripping segments 41, as shown in FIG. 3c, except for the rod gripping deformations 73 and 74. FIG. 7 illustrates how the rod gripping deformations 73 and 74 can be offset between adjacent rod gripping segments 71 and 72. By providing a plurality of diametrically opposed rod gripping segment pairs, such as two rod gripping segments 71, and two rod gripping segments 72, each with the pitch (number of deformations per unit length) of their rod deformations 73 and 73 offset one-half (½) the rod deformation pitch increment, and arraigned such that rod gripping segments 71 are always adjacent rod gripping segments 72, it is possible to increase effective rod gripping deformation pitch of the rod gripping assembly 70 by half. This methodology can also be applied to rod gripping assemblies 70 with any given number of diametrically opposed rod gripping segment pairs with rod gripping deformations 73 and 74 of the adjacent rod gripping segments 71 and 72 offset by the rod deformation pitch increment divided by the number of rod gripping segment pairs.

As rod 15 travels through RT-SCD 11 with rod gripping assembly 70, at any given time, only one rod gripping segment pair, such as rod gripping segments 71-71 or 72-72, will be engaged both with the rod 15 and the frusto-conical bore 57 of body element 51, and able to sustain a load imposed upon the RT-SCD 11. The remaining rod gripping segment pairs will not be engaged with the frusto-conical bore 57 of body element 51, only the rod 15, and are sometimes referred to as "floaters." The purpose of providing an RT-SCD 11 with a rod gripping assembly 70, is to increase the effective rod gripping deformation pitch, which in turn will reduce incremental travel and reseating of the rod 15 as it ratchets through the RT-SCD 11, and the DATSI value for that device.

Figure 8:
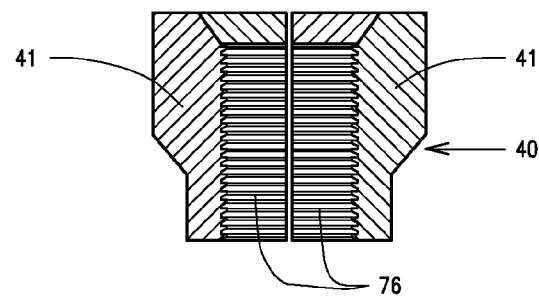
FIG. 8 is a cross-sectional view of the rod gripping segments with a specialized interior deformation configuration.

FIGS. 8, 9, 10, and 11 illustrate the concept of a RT-SCD 11 combined with a thread converting sleeve 81. Specifically, FIG. 8 is a cross-sectional view of a rod gripping assembly 40, with rod gripping segments 41, each with custom or specialized rod gripping deformations 76. The purpose of rod gripping deformations 76 is to reduce the incremental travel and reseating of the rod 15 as it ratchets through RT-SCD 11 with rod gripping assembly 40, in comparison to an RT-SCD 11 with rod gripping segments 41 configured to engage the standard threads 24 (FIG. 5) of commonly available rod 15.

Figure 10:
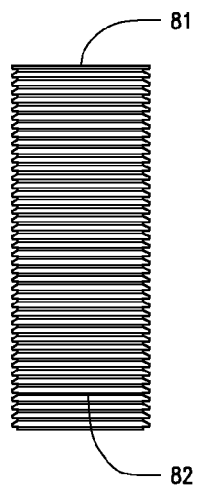
FIG. 10 is an elevation view of the rod thread converter sleeve.

FIG. 10 shows an elevational view of thread converting sleeve 81, with exterior rod deformations 81.

Figure 11:
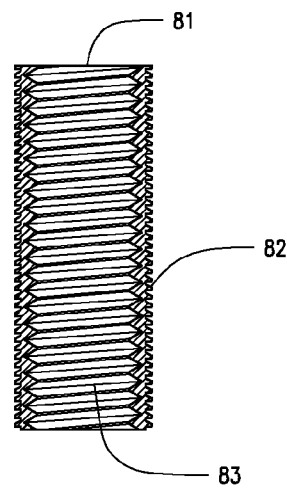
FIG. 11 is a cross-sectional view of the rod thread converter sleeve.

FIG. 11 shows a cross-section view of the sleeve 81, with exterior rod deformations 82, and interior threads 83. The interior threads 83 of thread converting sleeve 81 are configured to engage the standard thread profiles 24 of rod 15, while the exterior rod deformations are configured to engage the rod gripping deformations 76 of rod gripping segments 41 as shown in FIG. 9.

Figure 9:
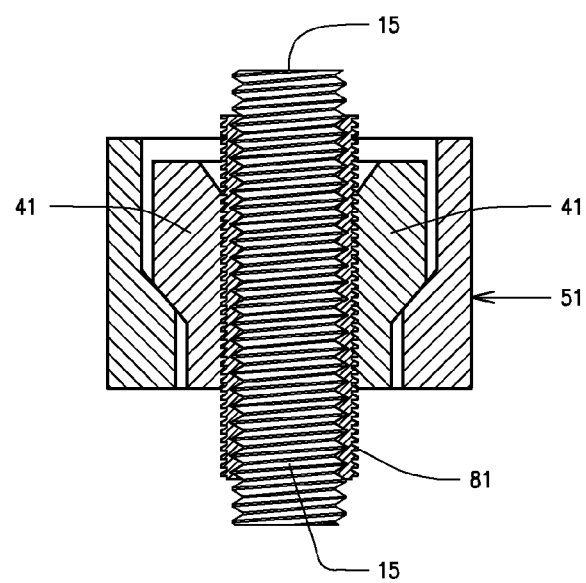
FIG. 9 is a cross-sectional view of a body element, rod gripping segments, rod thread converter sleeve, and rod.

FIG. 9 is a cross-sectional view of a body element 51 combined with a rod gripping assembly 40 (with rod gripping segments 41), thread converting sleeve 81, and rod 15 with threads 24. Converting sleeve 81 may be split into two or more longitudinal segments, and assembled on rod 15, before the installation of the RT-SCD 11. The purpose of thread converting sleeve 81, is to provide a means of converting the standard thread profile 24 of rod 15 to a rod deformation profile that will reduce the DATSI value of the RT-SCD 11.

Figure 12:
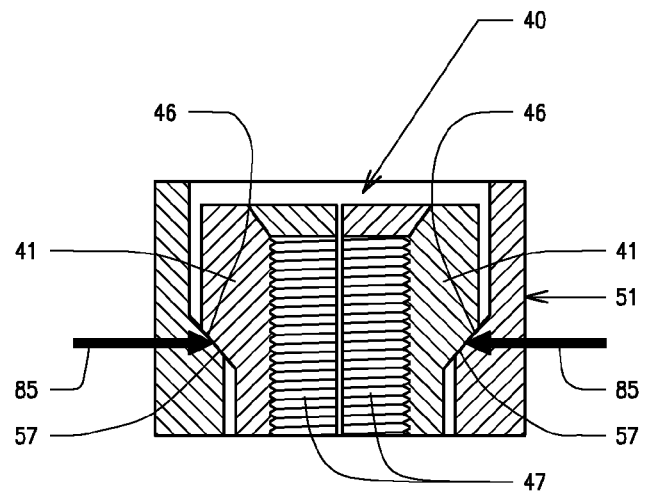
FIG. 12 is a cross-sectional view of the rod gripping segments and body element, with frusto-conical bearing surfaces, and depicting the location of the inwards clamping forces exerted by the body element on the rod gripping segments.

FIG. 12 is a cross-sectional view of body element 51, rod assembly 40, and rod gripping segments 41, and illustrates how the frusto-conical bearing surface 46 may be located so as to provide an inwards clamping pressure along the entire height (or axial length) of the rod gripping deformations 47. When the rod gripping segments 41 must resist a downwards acting force (as transferred from rod 15), the engaged bearing surfaces 46 and 57 create an inwards clamping force exerted by the body element 51 on the rod gripping segments 41. The resultant of this inwards clamping force is represented by clamping force arrows 85. In order to ensure that there will be positive engagement between the rod gripping deformations 47 and the threads (or rod deformations) 24 of rod 15, and that the RT-SCD 11 with function reliably, there should be an inwards clamping pressure between the rod gripping segments 41 and the rod 15 along the entire height (or axial length) of the rod gripping deformations 47. In order to achieve this, it then becomes necessary to configure the location of the frusto-conical bearing surface 46 so as to locate clamping force 85 within the middle third of the height (or axial length) of the rod gripping deformations 47, and preferably as close to the mid-height of the rod gripping deformations 47 as may be possible.

Figure 13:
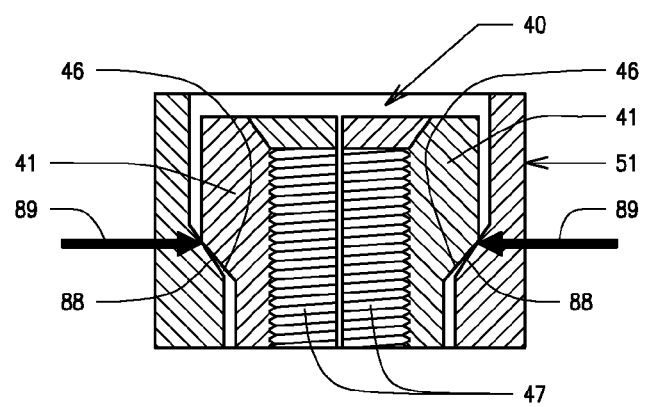
FIG. 13 is a cross-sectional view of the rod gripping segments and body element, with offset frusto-conical bearing surfaces, and depicting the location of the inwards clamping forces exerted by the body element on the rod gripping segments.

FIG. 13 is a cross-sectional view of body element 51, rod assembly 40, and rod gripping segments 41, and illustrates how the frusto-conical bore 88 of body element 51 may be modified so as to provide an inwardly directed clamping pressure along the entire height (or axial length) of the rod gripping deformations. As can be seen in FIG. 13, the frusto-conical bore 88 is configured to have a larger cone angle than that of the engaging surfaces 46 of the segments 4, and thereby provides a gap between it and the bottom of the frusto-conical bearing surface 46. Accordingly, a circumferential "point" contact bearing relationship is created between the facing frusto-conical surfaces of the body element 51 and the upper extremity of the segment bearing surfaces 46. Thus when the rod gripping segments 41 resist a downwards acting force (as transferred from an engaged rod 15), the circumferential point contact bearing between the rod gripping segments 41 and the frusto-conical bore 88 create an inwardly directed clamping force on the rod gripping segments 41. The resultant of this inwardly directed clamping force is represented by the arrows 89.

In order to ensure that there will be positive engagement between the gripping deformations 47 and the threads (or other rod deformations) 24 of an engaged rod 15, and that the RT-SCD 11 will function reliably, there should be an inwardly directed clamping pressure applied between the rod gripping segments 41 and the rod 15 along the entire height (or length) of the rod gripping deformations 47. In order to achieve this, it is necessary to configure the location of the frusto-conical bearing surface 46 of the rod gripping segments 41, along with the configuration of the frusto-conical bore of body element 51, so as to locate the clamping force 89 within the middle third of the axial length of the rod gripping deformations 47, and preferably as close to the mid-height thereof as may be possible. In addition, the gap provided between the bottom of the frusto-conical bearing surface 46 and the frusto-conical bore 88 will allow the rod gripper assembly 40 to gimbal within body element 51, thus providing some additional misalignment tolerance between the RT-SCD 11 and the rod 15.

Figure 14:
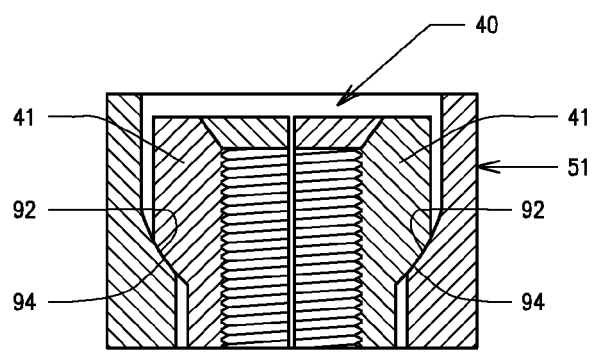
FIG. 14 is a cross-sectional view of the rod gripping segments and body element, with spherical bearing surfaces.

FIG. 14 is a cross-sectional view of another alternative relational configuration of body element 51, rod gripping assembly 40, and rod gripping segments 41. In this embodiment, rod gripping segments 41 are configured with spherical ("frusta-spherical") bearing surfaces 92, instead of a frusto-conical bearing surface 46, as shown in FIG. 3b. Body element 51 is similarly configured with a frusto-spherical bore 94, instead of a frusto-conical bore 57, as shown in FIG. 3c. The purpose of providing the body element 51 and rod gripping segments 41 with frusto-spherical bearing surfaces 94 and 92, respectively, is that it will allow the rod gripping assembly 40 to gimbal within the body element 51, while also providing positive bearing contact between the spherical bearing surfaces 94 of the rod gripping segments 41 and the spherical bore 92 of the body element 51, thus improving the misalignment tolerance between the RT-SCD 11 and the rod 15, as shown in FIG. 1.

Figures 14A, 14B:
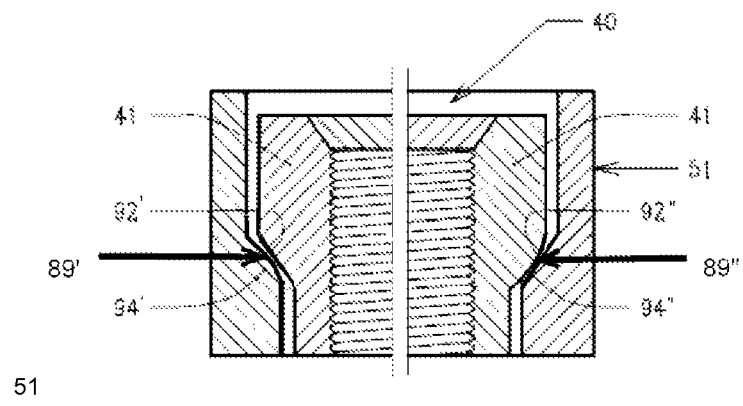
FIGS. 14A and 14B are cross-sectional views of the rod gripping segments and body element, with different combinations of conical and spherical bearing surfaces.

As depicted in FIGS. 14A and 14B, which illustrate two different embodiments of bearing surfaces in side-by-side relationship, it is also possible to configure the bearing surfaces of both the rod gripping segments 41 and the body element 51 with a combination of frusto-conical and frusto-spherical surfaces. In FIG. 14A the upper bearing surfaces 92' are frusto-conical and the lower bearing surface 94' is frusto-spherical. Conversely, in the embodiment of FIG. 14B the upper bearing surfaces 92" are frusto-spherical and the lower bearing surface 94" is frusto-conical. As a consequence, a circumferential "point contact" bearing relationship is formed between the lower bearing surface of body element 51 and the upper bearing surfaces of the rod gripping segments 41. These components are also configured to provide gaps (separations) above and below the bearing surfaces so as to allow the rod gripping segments 41 to gimbal within the body element 51.

Figure 15:
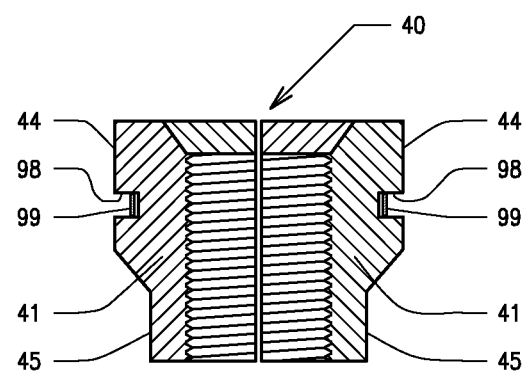
FIG. 15 is a cross-sectional view of the rod gripping segments with a circumferential groove, and band.

FIG. 15 is a cross-sectional view of another alternative embodiment of a rod gripping assembly 40 and functionally associated rod gripping segments 41. A continuous circumferential groove 98 is provided along the exterior surface of the upper portion 44 of the rod gripping segments 41. Groove 98 may also be located along the exterior surface of the lower portion 45 of the rod gripping segments 41. Within groove 98 is a circumferential band 99 that runs continuously around the rod gripping segments 41. The size and shape of the groove 98 and circumferential band 99 may vary, but are configured to limit the differential vertical movement between adjacent rod gripping segments 41. This done to ensure that all of the rod gripping segments 41 will ratchet at the same time, or within an acceptable tolerance range, and minimize the potential for "floaters," or rod gripping segments 41 that fail to ratchet along with the other rod gripping segments 41, and are not engaged with the body element 51.

Figure 16B:
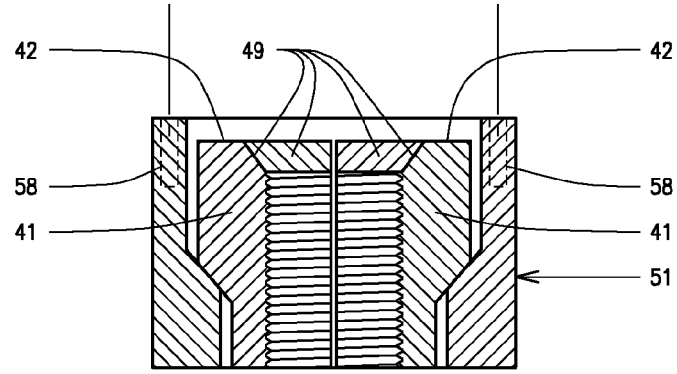
FIG. 16b is a cross-sectional view of the rod gripping segments and body element.

FIGS. 16a and 16b illustrate an expanded cross-sectional view of a cap element 31, and body element 51 with a rod gripping assembly 40. In FIG. 16a cap element 31 includes a rod gripping segment spreader projection 106, with bottom surface 107, and contact surface 108. In FIG. 16b the rod gripping assembly 40 is provided with a frusto-conical bore 49 extending into the top surface 42 of the rod gripping segments 41. Both the spreader projection 106 and the frusto-conical bore 49 are configured so that when the rod gripper segments 41 are pushed upwards (by a rod 15) towards the cap element 31, the frusto-conical surfaces 49 of the rod gripping segments 41 will engage contact surface 108 of the spreader projection 106, causing the rod gripping segments to spread outwards, and disengage from the rod 15 (not shown). The purpose of this is to provide a means which assists in the rapid disengagement of the rod gripping segments 41 of RT-SCD 11 from rod 15, as well as reduces the force required to cause rod 15 to ratchet through RT-SCD 11, and thereby increase the performance and functionality of the RT-SCD 11.

Figure 17:
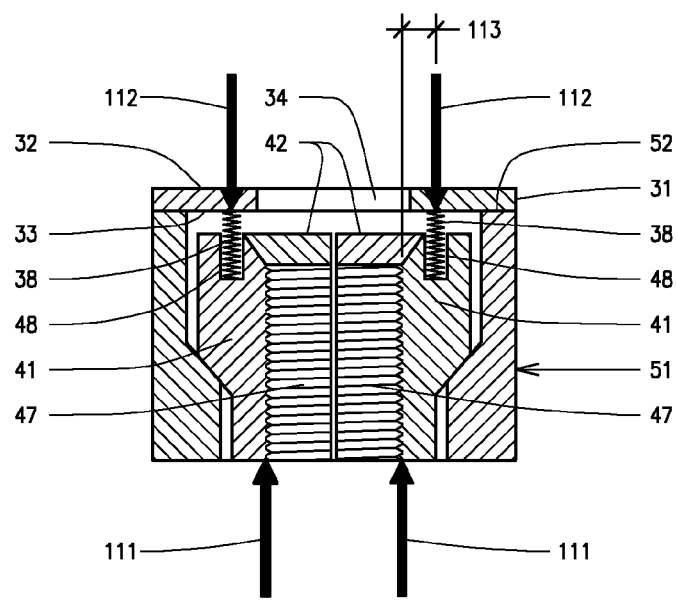
FIG. 17 is a cross-sectional view of the cap plate, urging springs, rod gripping segments and body element, and depicting the location of the forces exerted on the rod gripping segments by the rod and urging springs.

FIG. 17 is a cross-sectional view of a body element 15, cap element 31, rod gripping segments 41, and urging springs 38. Urging springs 38 are inserted into apertures 48 in the top surface 42 of rod gripping segments 41, and are compressed between cap element 31 and the segments 41, and provide urging forces 112 that force the rod gripping segments 41 into the bore of body element 51. When a rod 15 ratchets through a RT-SCD 11, it will exert a rod force 111 on the rod gripping deformations 47 of the rod gripping segments 41.

When the rod gripping segments 14 are pushed up towards the cap element 31 by a rod 15 (not shown), the offset distances 113 between the spring urging forces 112 and rod force 111 will create a force couple that will cause the rod gripping segments 41 to rotate the top portions of the rod gripping segments 41 outwardly, disengaging from the rod 15 (not shown). The purpose of this is to provide a system which assists in the rapid disengagement of the rod gripping segments 41 of RT-SCD 11 from rod 15, as well as reduces the force required to cause rod 15 to ratchet through RT-SCD 11 and thus increase the performance and functionality of the RT-SCD 11.

Figure 18A:
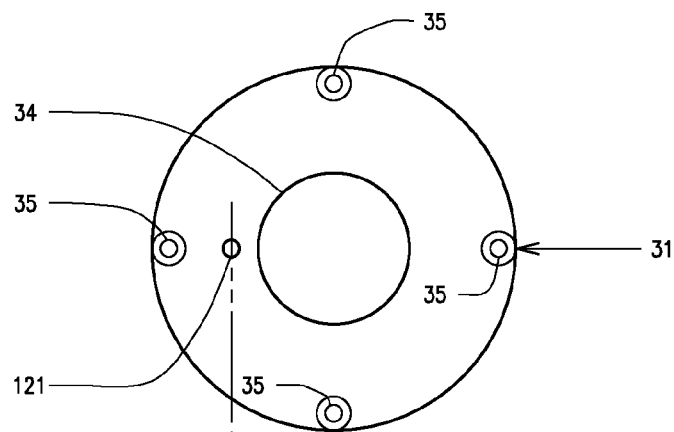
FIG. 18a is a plan view of a cap element with a locking pin aperture.
Figure 18B:
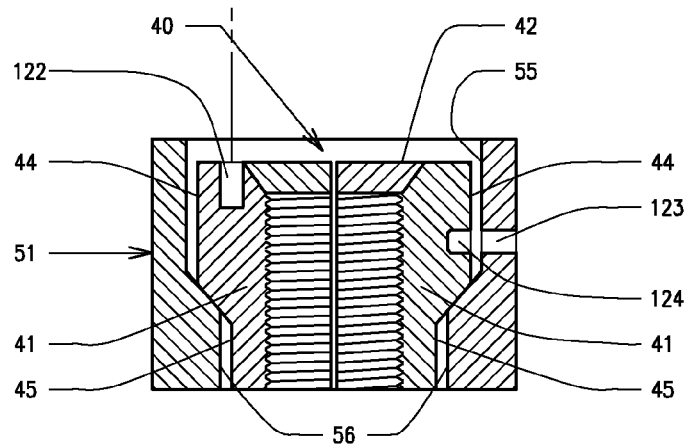
FIG. 18b is a cross-sectional view of the rod gripping segments and body element showing the locations of locking pin apertures in the rod gripping segments, and body element.

FIGS. 18a and 18b illustrate an embodiment in which the rod gripping assembly 40, and rod gripping segments 41 can be temporally locked to the cap element 31 or body element 51 in order to facilitate the removal of the RT-SCD 11 by spinning it back up rod 15.

FIG. 18a shows a top view of cap element 31, which is essentially the same as cap element 31 shown in FIG. 2a, with the addition of an aperture 121.

FIG. 18b shows a cross-sectional view of a body element 51 combined with a rod gripping assembly 40 including rod gripping segments 41. Body element 51 includes an aperture 123 that extends through a side wall of the upper portion of the element. At least one of the rod gripping segments 41 of the assembly 40 will be provided with a bore 124 which extends laterally into a sidewall thereof and can be aligned with aperture 123. Aperture 123 and bore 124 are configured so as to allow a pin or rod to be inserted through the aperture and into the bore to temporarily lock the assembly 40 to element 51, and thus facilitate the removal of the RT-SCD 11 from a rod passing there through (not shown). Aperture 123 may alternatively be located in a lower portion of the side wall and segment.

As also shown in FIG. 18b, a bore 122 is provided in the top surface 42 of one or more of the segments 41. Aperture 121 and bore 122 are configured so as to allow a pin or rod to be inserted through aperture 121 into aperture 122 to temporarily lock he rod gripping assembly to the body element 51 to facilitate removal of the RT-SCD 11 from a rod 15 (not shown) to which it is attached. The bore 122 may also be one of the bores 48, as shown in FIG. 3b or 17, that contains an urging springs 38, in which case at least a distal portion of the locking pin might be of a reduced diameter so as to be insertable into the axial opening in one of the springs 38.

Figure 19:
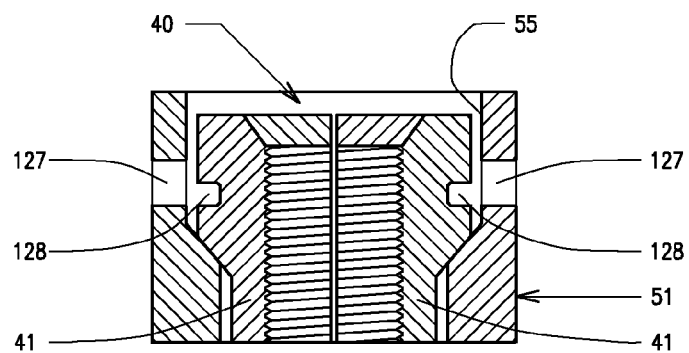
FIG. 19 is a cross-sectional view of the rod gripping segments and body element showing the location of the rod gripping segment lifter pin groove in the rod gripping segments, and the rod gripping segment apertures in the body element.

FIG. 19 illustrates another alternative embodiment of a means by which a rod gripping segment 41 might be caused to temporarily disengage a rod 15 (not shown) to allow the rapid removal of an RT-SCD 11 from the rod. In this case the body element 51 might include at least one pair of diametrically opposed apertures 127 that extend through the side wall of the upper bore 55 of a body element 51, and at least one pair of diametrically opposed rod gripping segments 41 might be provided with pin receiving openings 128 that are configured as round holes, partial circumferential grooves or horizontal slots, or even a continuous groove around the circumference of the rod gripping assembly 40.

The openings 127 and 128 would be configured so as to allow a pin or rod to be inserted through the apertures 127 to engage the holes, grooves or slots 128 to enable the rod gripping assembly 40 to be forced upwards towards the cap plate 31 (not shown) causing the rod gripping segments 41 to disengage from the rod 15 (not shown). Still another alternative might be to insert a pin having an eccentric protuberance extending from its distal end to engage the hole, groove or slot 128, and through rotation thereof lift the gripping segments out of engagement with an otherwise captured rod to allow for the rapid removal of the RT-SCD 11 from the rod.

Figure 20:
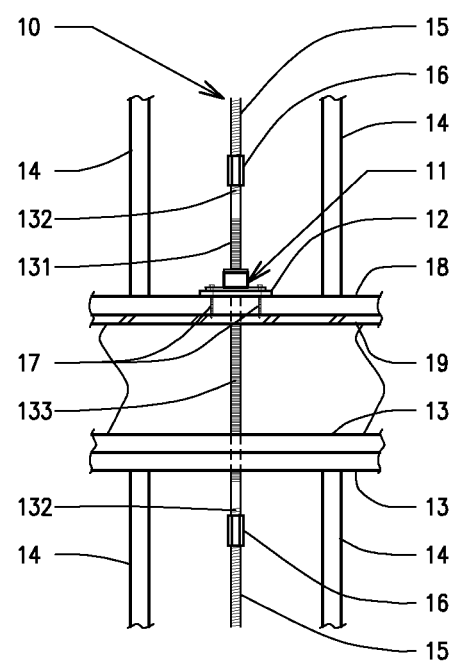
FIG. 20 is an elevation of a CTS at an RT-SCD with a length of rod with a specialized deformation pattern running through the RT-SCD.

FIG. 20 is a partial elevation of the CTS 10 shown in FIG. 1, and illustrates a way a length of rod 131, with rod deformations 133, may be incorporated into a CTS 10. CTS 10 includes bearing plate 12, top plates 13, studs 14, rods 15, couplers 16, fasteners 17 sill plate 18, and plywood sheathing 19. Rods 15 will typically have standard thread profiles 24. Rod 131 is provided with a length of rod deformations 133, and standard threads 132 at each end so as to allow rod 131 to be coupled to rods 15. Rod deformations 133 pass through and engage RT-SCD 11.

RT-SCD 11 is configured with rod gripping segments 41, each with custom or specialized rod gripping deformations similar to the rod gripping deformations 76 shown in FIG. 8, and configured to engage the rod deformations 133 of rod 131. The purpose of rod deformations 133 is to reduce the incremental travel and reseating of the rod 131 as it ratchets through RT-SCD 11, particularly in comparison to a RT-SCD 11 with rod gripping segments 41 configured to engage the standard threads 24 of commonly available rod 15, and thus improve the performance of the RT-SCD 11 and CTS 10.

The invention claimed is:

1. A ratcheting shrinkage compensating device for use with an elongated tie-down rod to provide a shrinkage compensating system for countering separation between first and second building components due to shrinkage, comprising:

a body element for attachment to one of the building components and having an outer surface that is generally cylindrical in shape, and internal surfaces that include
an upper bore of a first diameter,
a lower bore of a second diameter smaller than said first diameter, and
a transitional surface transitioning between the upper bore and lower bore and forming a lower bearing surface;
a plurality of tie-down rod gripping segments located within the body element, each said segment being configured to have
an inner side surface having specialized deformations for engaging the threads of a standard, threaded tie-down rod attached to the other building component, and
an outer side surface including
an upper surface portion having a transverse groove formed therein,
a lower surface portion, and
a transitional surface portion transitioning between said upper surface portion and said lower surface portion and forming an upper bearing surface portion,
said segments being disposed in a circular array concentric with said upper and lower bores and surrounding a tie-down rod receiving passageway, the upper surface portions of the segments forming the array generally defining a third diameter smaller than said first diameter, and the transverse grooves in the upper surface portions collectively forming a segmented circumferential groove, the lower surface portions of the segments forming the array generally defining a fourth diameter less than said second diameter, and the transitional surface portions collectively forming a segmented upper bearing surface for engaging said lower bearing surface;
a continuous band disposed in said circumferential groove and dimensioned to fit therewithin to engage upper and lower sides of said transverse grooves and serve to minimize differential vertical displacement among the several tie-down rod gripping segments without applying compressing force to said segments;
a cap element attached to the top of the body element and having a first central aperture configured to receive a standard, threaded tie-down rod extended through said passageway;
a base plate attached to the bottom of the body element and having a second central aperture configured to receive the tie-down rod extended through the passageway, and means for attaching said base plate to the one building component; and
means disposed beneath said cap for resiliently urging said segments downwardly causing said segmented upper bearing surface to engage said lower bearing surface thereby biasing said segments inwardly toward said passageway and causing said deformations to grippingly engage the tie-down rod extended through said passageway.

2. A ratcheting shrinkage compensating device as recited in claim 1 wherein the standard tie-down rod to be engaged is a threaded rod having American Standard Coarse Threads, and wherein said specialized deformations formed in said inner side surfaces of said segments and intended to face and engage the threads of the rod are dual lead threads respectively starting 180 degrees apart and having a thread profile that extends toward an apex at the Minor Diameter of the profile to thereby enhance mating engagement thereof with the threads of the rod.

3. A ratcheting shrinkage compensating device as recited in claim 1 wherein said lower bearing surface is frusto-conical and said segmented upper bearing surface is frusto-spherical whereby said segments are allowed to gimbal within said cavity to accommodate misalignment between said rod and said segments.

4. A ratcheting shrinkage compensating device as recited in claim 1 wherein said lower bearing surface is frusto-spherical and said segmented upper bearing surface is frusto-conical whereby said segments are allowed to gimbal within said cavity to accommodate misalignment between said rod and said segments.

5. A ratcheting shrinkage compensating device as recited in claim 1 wherein said lower bearing surface is frusto-conical at a first cone angle, and said segmented upper bearing surface is frusto-conical at a second cone angle different from said first cone angle whereby said segments are allowed to gimbal within said cavity to accommodate misalignment between said rod and said segments.

6. An improved ratcheting-type rod engaging and disengaging nut component for use with an elongated tie-down rod to provide a shrinkage compensating system for countering separation between first and second building components due to shrinkage, comprising:

a generally cylindrical body element for attachment to one of the building components and having a multipart internal bore including an upper, generally cylindrical portion having a first diameter, a lower, generally cylindrical portion having a second diameter less than said first diameter, and a transitional portion interconnecting said upper bore and said lower bore and forming a lower bearing surface;

an assembly of rod gripping segments disposed within said internal bore and surrounding a passageway for receiving the elongated tie-down rod attached to the other building component and passing through said cylindrical body, such rod having American Standard Coarse Threads, each said segment including an outwardly facing surface having a portion forming an upper bearing surface adapted to slidingly engage said lower bearing surface, and an inwardly facing surface having surface deformations in the form of double lead threads offset 180 degrees from each other, and the Minor Diameter is of a standard Sharp V-thread profile to maximize the engagement between the threads of the rod gripping segments and the rod threads, and means disposed at the upper extremity of said body element for containing said segments within said internal bore and including resilient means resiliently urging the upper bearing surfaces of the segments into sliding engagement with said lower bearing surface thereby causing the facing surfaces of said segments to grippingly engage the tie-down rod extending through the nut, said resilient means being compressible by a force resulting from upward movement of said rod relative to said body caused by shrinkage of the first and/or second building components thereby allowing the segments to become disengaged from the rod until such upward movement terminates and said segments are again caused by said resilient means to grippingly engage the rod.

7. An improved ratcheting-type rod engaging and disengaging nut component as recited in claim 6 wherein said lower bearing surface is frusto-conical in configuration and said assembly of rod gripping segments collectively form a segmented upper bearing surface that is frusto-spherical in configuration whereby said segments are allowed to gimbal within said cavity to accommodate misalignment between said rod and said segments.

8. An improved ratcheting-type rod engaging and disengaging nut component as recited in claim 6 wherein said lower bearing surface is frusto-spherical in configuration and said assembly of rod gripping segments collectively form a segmented upper bearing surface that is frusto-conical in configuration whereby said segments are allowed to gimbal within said cavity to accommodate misalignment between said rod and said segments.

9. An improved ratcheting-type rod engaging and disengaging nut component as recited in claim 6 wherein each said segment includes an additional outwardly facing surface portion having a transverse groove formed therein such that in the assembly of rod gripping segments the several grooves collectively form a segmented circumferential groove, and a continuous circumferential band is disposed therein, said band being dimensioned to fit within said circumferential groove in a manner so as to minimize differential displacement among the several rod gripping segments.

10. An improved ratcheting-type rod engaging and disengaging nut component as recited in claim 6 wherein said lower bearing surface is frusto-conical in configuration and at a first cone angle, and said assembly of rod gripping segments collectively form a segmented upper bearing surface that is frusto-conical in configuration and at a second cone angle different from said first cone angle whereby said segments are allowed to gimbal within said cavity to accommodate misalignment between said rod and said segments.

11. A ratcheting shrinkage compensation system, comprising:

an elongated tie-down rod, one end of which is adapted for attachment to a first building component otherwise secured to a second building component, said rod being threaded along at least a part of its length with threads at least generally consistent with American Standard Coarse Thread profile standards; and a body element adapted for attachment to the second building component and having an internal cavity formed therein with top and bottom openings through which the threaded part of said rod extends, said cavity being formed in part by body element walls having interiorally facing frusto-conical or frusto-spherical surface portions concentric with and surrounding said rod, said frusto-conical or frusto-spherical surface portions forming a lower bearing surface, a plurality of rod gripping segments disposed within said cavity and in an array surrounding said rod, said segments having interior walls facing said rod and having deformations formed therein adapted to interlockingly engage the threads on said rod, said deformations being dual threads starting 180 degrees apart and having a thread profile that extends the Minor Diameter of a standard thread profile toward an apex producing a thread profile at the Minor Diameter similar to that of a standard Sharp V-Thread profile to thereby enhance mating engagement with the threads of the rod, the segments in said array further having generally exteriorly facing walls with at least portions thereof being shaped to collectively form a segmented frusto-conical or frusto-spherical upper bearing surface adapted to engage and rest upon said lower bearing surface; and a plurality of resilient means disposed within said cavity and around said top opening, and respectively adapted to resiliently engage one of said segments and thus urge said segmented upper bearing surface into engagement with said lower bearing surface thereby biasing the interior walls of said segments into locking engagement with said rod, said resilient means being compressible by a force resulting from upward movement of said rod relative to said body caused by shrinkage of the first and/or second building components thereby allowing the segments to become disengaged from the rod until such upward movement terminates and said segments are again caused by said resilient means to grippingly engage the rod.

12. A ratcheting shrinkage compensation system as recited in claim 11 wherein said lower bearing surface is frusto-conical and said segmented upper bearing surface is frusto-spherical whereby said segments are allowed to gimbal within said cavity to accommodate misalignment between said rod and said segments.

13. A ratcheting shrinkage compensation system as recited in claim 11 wherein said lower bearing surface is frusto-spherical and said segmented upper bearing surface is frusto-conical whereby said segments are allowed to gimbal within said cavity to accommodate misalignment between said rod and said segments.

14. A ratcheting shrinkage compensation system as recited in claim 11 wherein said lower bearing surface is frusto-conical at a first cone angle, and said segmented upper bearing surface is frusto-conical at a second cone angle different from said first cone angle whereby said segments are allowed to gimbal within said cavity to accommodate misalignment between said rod and said segments.

* * * * *